United States Patent [19]

Nagano

[11] Patent Number: 4,611,500
[45] Date of Patent: Sep. 16, 1986

[54] BRAKE OPERATING DEVICE
[75] Inventor: Masashi Nagano, Izumi, Japan
[73] Assignee: Shimano Industrial Company Limited, Osaka, Japan
[21] Appl. No.: 682,313
[22] Filed: Dec. 17, 1984
[30] Foreign Application Priority Data Dec. 29, 1983 [JP] Japan .................. 58-203723[U]

[51] Int. Cl.$^4$ .................. G05G 7/00; F16C 3/28; B62L 3/02
[52] U.S. Cl. .................. 74/489; 74/522; 74/571 M; 74/501 R
[58] Field of Search ............ 74/488, 489, 522, 501 R, 74/571 M, 501 B, 502.2

[56] References Cited

U.S. PATENT DOCUMENTS

| 4,005,613 | 2/1977 | Kaufman et al. | 74/489 |
| 4,023,653 | 5/1977 | Yoshigai | 188/24 |
| 4,084,449 | 4/1978 | Kine | 74/522 X |
| 4,348,916 | 9/1982 | Shimano | 74/522 X |

FOREIGN PATENT DOCUMENTS

| 14311 | 11/1911 | France . |
| 50-132852 | 10/1975 | Japan . |
| 518932 | 3/1940 | United Kingdom . |
| 778809 | 7/1957 | United Kingdom . |

Primary Examiner—Allan D. Herrmann
Attorney, Agent, or Firm—Stevens, Davis, Miller & Mosher

[57] ABSTRACT

A brake operating device mounted to a bicycle handle, in which a bracket having a first abutting member pivotally supports an operating lever having a second abutting surface for abutting the first abutting surface. Each abutting surface is formed in a circular arc centered at a position spaced from the pivot point of the lever relative to the bracket. The pivot point is shifted on the circumference of a circle which is concentric with the circular arcs forming the first and second abutting surfaces to adjust the grip dimension between the handle and the operating lever.

6 Claims, 8 Drawing Figures

BRAKE OPERATING DEVICE

FIELD OF THE INVENTION

This invention relates to a brake operating device used for a bicycle and mounted to a handle thereof, and more particularly to a brake operating device used for a bicycle, which comprises a bracket fixed to the handle and an operating lever pivoted to the bracket, an operating wire being retained at one end of the operating lever and fixed at the other end to a brake at the bicycle, so that a cyclist grips the operating lever to actuate the brake.

BACKGROUND OF THE INVENTION

The brake operating device constructed as described above has hitherto been disclosed in, for example, the Japanese Utility Model Laid-Open Gazette No. Sho 50-132,852. Such device is provided with an inverted-L-like-shaped operating lever comprising a grip and a pivoting portion so that the pivoting portion is mounted swingably to the bracket through a lever shaft. The bracket abuts at the end face (to be called hereinafter the first abutting face) against an end face (to be called hereinafter the second abutting surface) at the pivot portion of the lever, thereby restricting the lever in its unidirectional swinging motion and controlling the return position of the lever which is returned by a return spring at the brake.

The return position of the lever is restricted to determine a grip dimension defined as an interval between the grip of the lever and the handle. This interval is significantly different in its proper value between bicycles for adults and bicycles for children, so that the grip dimension, when the same braking operating device is intended to be mounted to the bicycles both for adults and children, must be changeable.

The aforesaid conventional brake operating device, which has a changeable grip dimension, uses an adjusting bolt which screws with the bracket in a perforating manner so as to abut at its tip against the surface of the pivot portion of the lever opposite to the bracket, thereby adjusting the bolt in its screw position to change the operating lever in the return position thereof.

Such conventional construction allows the operating lever to swing around the pivot point thereof to adjust the lever in position with respect to the bracket. Hence, when the adjusting bolt is operated to change the grip dimension, the second abutting surface at the operating lever moves away from the first abutting surface at the bracket to produce a gap between both the abutting surfaces, thereby creating a problem in that an appearance of the brake operating device is poor. Also, since the bolt contacts at its tip with the end face of the lever to restrict the return position thereof, a problem is created in that the lever is not stably restricted in the return position. Furthermore, the tip of the adjusting bolt only is subjected to a load applied to the operating lever when returned, whereby the adjusting bolt and the operating lever at the abutting surface thereof are subjected to a great deal of wear, thereby creating a problem in durability.

SUMMARY OF THE INVENTION

An object of the invention is to provide a brake operating device which has a changeable grip dimension, allows the second abutting surface of the operating lever to be always in close contact with the first abutting surface of the bracket even when the grip dimension is changed, and enables stable restriction to the return position of the lever, whereby the brake operating device is protecting from wearing, has a good aesthetic appearance, and is superior in durability.

This invention is characterized in that in a brake operating device comprises; a bracket having a first abutting surface; an operating lever having a grip portion and a pivot portion, the pivot portion being pivotally supported to the bracket and having a second abutting surface which abuts against the first abutting surface to restrict the lever in its unidirectional swinging motion whereby the lever is returned to its rest position and a pivot means including a lever shaft through which the operating lever is pivoted to the bracket. The first and second abutting surfaces each are formed in the shape of a circular arc centered at a position spaced from the pivotal center at the pivot means and an adjusting means is provided which shifts the pivotal center on the circumference of a circle concentric with the circular arc forming the respective abutting surfaces and fixes the pivot means to the bracket at the position to which the pivotal center is shifted, thereby adjusting the grip dimension.

In other words, the brake operating device of the invention can adjust the grip dimension by turning the lever through both the abutting surfaces to rotate around the point apart from the pivotal center of the lever so that the pivot point of the lever is shifted on the circumference of the circle concentric with the circular arcs at the abutting surfaces.

Accordingly, the pivot point of the operating lever can be shifted to change the grip dimension and the operating lever is surely brought at its second abutting surface in close contact with the first abutting surface at the bracket regardless of any change in the grip dimension. Hence, the brake operating device of the invention has a good appearance, represents a stereoscopic feeling of the lever which is level with the surface of the bracket, stably controls the return position of the lever, has reduced wear at the abutting surfaces, and has improved durability.

These and other objects of the invention will be seen by reference to the description, taken in connection with the accompanying drawings.

DETAILED DESCRIPTION OF THE INVENTION

Figure 1:
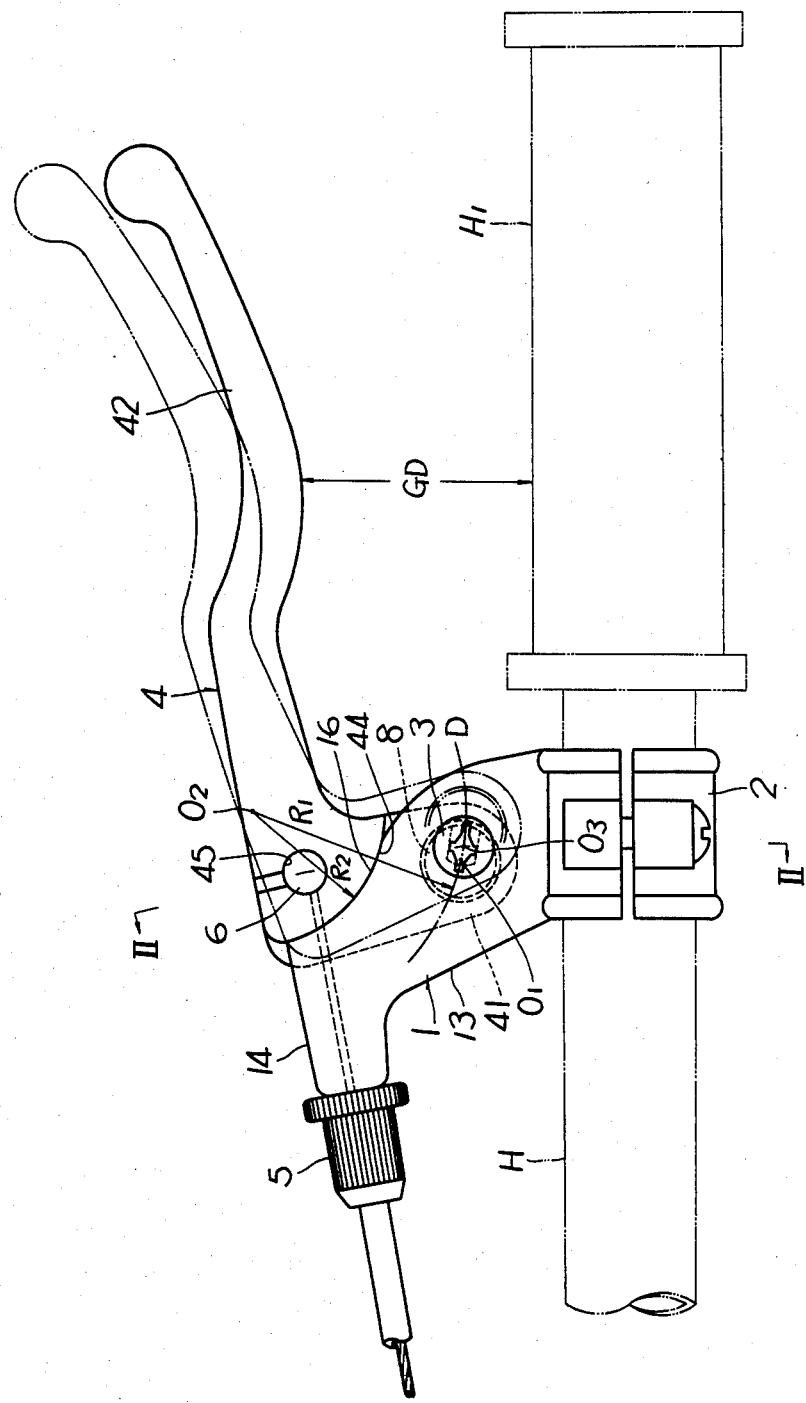
FIG. 1 is a side view of an embodiment of a brake operating device of the invention.
Figure 2:
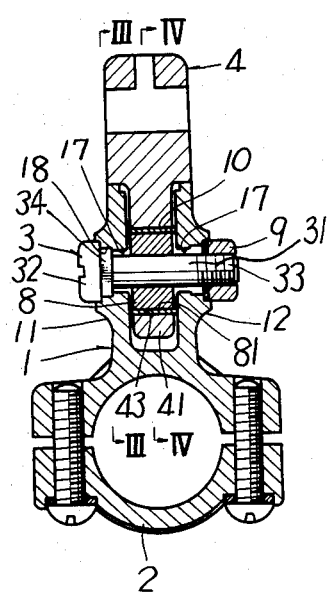
FIG. 2 is a sectional view taken on the line II—II in FIG. 1.
Figure 3:
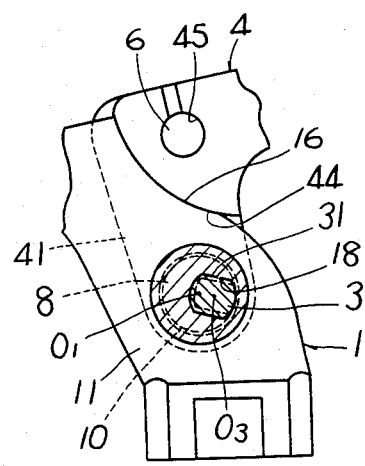
FIG. 3 is a sectional view taken on the line III—III in FIG. 2.
Figure 4:
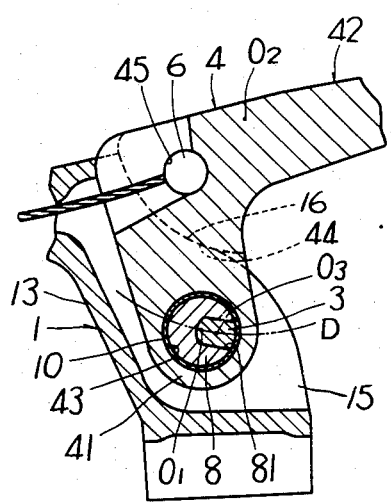
FIG. 4 is a sectional view taken on the line IV—IV in FIG. 2.
Figure 5:
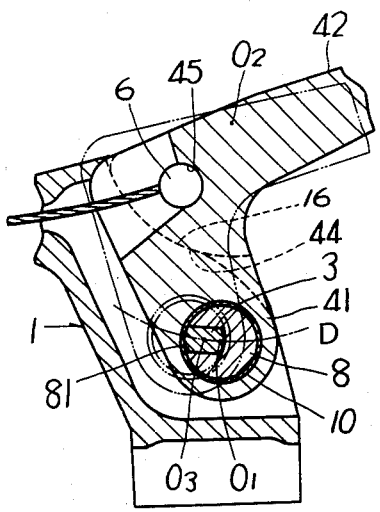
FIG. 5 is an illustration of the FIG. 1 embodiment, in which a pivot point is shifted.

Referring to FIGS. 1 through 3, a brake operating device is shown, which is mounted to a flat type handle H in the vicinity of a grip $H_1$ thereof and comprises a bracket 1 mounted to the handle H through a fixture 2, a lever shaft 3 mounted to the bracket 1, and an operating lever 4 supported swingably to the bracket 1 through the lever shaft 3.

The bracket 1 comprises a pair of side walls 11 and 12 opposite to each other, and a front wall 13 and an upper wall 14 which connect the side walls 11 and 12 respectively. Between the side walls 11 and 12 is provided an opening 15 which opens rearwardly, and at the end face thereof are provided first abutting surfaces 16 for restricting the operating lever 4 in a range of unidirectional swinging motion. Also, the side walls 11 and 12 are provided at the central portions with bearing bores 17 for supporting the lever shaft 3. At the upper portion of the front wall 13 is supported a holder 5 for an outer sheath guiding an operating wire.

The operating lever 4 comprises a pivot portion 41 inserted into the bracket 1 and pivoted to the lever shaft 3 and an operating portion 42 bent perpendicularly relative to the pivot portion 41 and extending outwardly therefrom, the pivot portion 41 providing a shaft bore 43 supported swingably to the lever shaft 3. The pivot portion 41 is provided at the end at a side of the operating portion 42 with second abutting surfaces 44 to abut against the first abutting surfaces 16 of bracket 1 respectively. Also, a support bore 45 is provided at the connecting portion between the pivot portion 41 and the operating portion 42, and supports a columnar retainer 6 fixing a terminal of the operating wire.

In the brake operating device constructed as abovementioned, the abutting surfaces 16 and 44 at the operating lever 4 and bracket 1 each are formed in a circular arc having its center at point $O_2$ which is spaced a distance from the pivot point $O_1$ for the operating lever 4, and an adjusting means is provided which shifts the pivot point $O_1$, and in turn the lever shaft 3, on the circumference of a circle which is concentric with the aforesaid circular arcs at abutting surfaces 16 and 44 and fixes the lever shaft 3 at its shifted position to thereby adjust a grip dimension GD.

The adjusting means shown in the drawing comprises the shaft bore 43 at the operating lever 4, which has a larger diameter than the lever shaft 3, and a bushing having an eccentric recess 81.

In detail, the bushing 8 has a round outer periphery, the lever 4 is fitted through its shaft bore 43 rotatably onto the bushing 8, the eccentric recess 81 is made non-round, and the lever shaft 3 is fitted at an intermediate portion 31 into the recess 81, such that lever shaft 3 is non-rotatable relative to recess 81.

Figure 6:
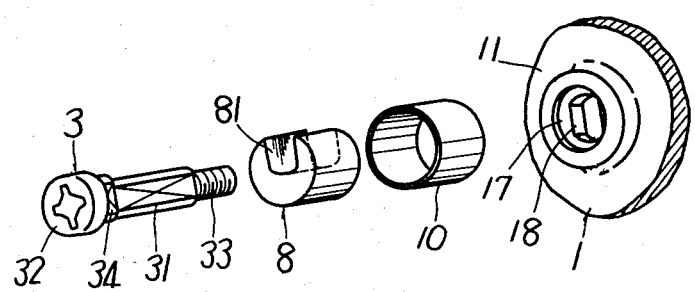
FIG. 6 is a perspective exploded view of an adjusting means.

The lever shaft 3, as shown in FIGS. 2 and 6, is formed non-round in section at the intermediate portion 31 and has at one end a head 32 having a rotary control and at the other end a screw thread 33, the head 32 projecting outwardly from the side wall 11, the screw thread 33 projecting outwardly from the side wall 12 and screwing with a lock nut 9, thereby fixing the lever shaft 3 to the bracket 1 by tightening the nut 9.

Axially outside one bearing bore 17 is provided a non-round (rectangular in the drawing) retaining bore 18 and at the head 32 of lever shaft 3 is provided a non-round (rectangular in the drawing) engaging portion 34, so that the engaging portion 34 engages with the retaining bore 18 to restrain the lever shaft 3 from rotating with respect to the bracket 1 and disengages from the same to enable lever shaft 3 to be rotated at a predetermined angle (180° in the drawing) with respect to the bracket 1, thereby enabling the pivot point $O_1$ to shift on the circumference of the concentric circle D.

In the aforesaid construction, the operating lever 4 swings around the center of bushing 8, in turn the pivot point $O_1$. Accordingly, when the lever shaft 3 rotates with respect to the bracket 1, the bushing 8, which is fitted onto the lever shaft 3 non-rotatably relative thereto through the eccentric recess 81, rotates together with the lever shaft 3, resulting in that the pivot point $O_1$ shifts on the circumference of concentric circle D.

Hence, the lever 4 swings around the center $O_2$ of the concentric circle D, thereby adjusting the grip dimension GD.

Also, in the aforesaid embodiment, the first abutting surfaces 16 are provided at both the side walls 11 and 12 respectively, and the second abutting surfaces 44 are provided at both sides of operating lever 4. The center $O_2$ of the circular arcs forming the abutting surfaces 16 and 44 is provided at the root of operating portion 42, and a curvature $R_1$ of concentric circle D is larger than that $R_2$ of the respective abutting surfaces 16 and 44. In addition, a sleeve 10 is fitted onto the bushing 8.

The brake operating device of the invention constructed as abovementioned, normally restrains the lever shaft 3 and bushing 8 from rotating with respect to the bracket 1 as abovementioned.

In a case where the grip dimension GD is changed, the lock nut 9 is released to pull out the lever shaft 3 to a certain extent at the head side to disengage the engaging portion 34 from the retaining bore 18 and the lever shaft 3 is rotated at an angle of 180° with respect to the bracket 1. Hence, during this operation, the bushing 8 rotates together with the lever shaft 3, the pivot point $O_1$ for the lever 4 shifts on the circumference of concentric circle D, and the operating portion 42 at the lever 4 changes in position two-stepwise, i.e., to assume one of two different positions, with respect to the handle H as shown by the chain line in FIG. 1, thereby changing the grip dimension GD. Also, after changing the grip dimension GD, the second abutting surfaces 44 at the operating lever 4 can be brought into close contact with the first abutting surfaces 16 at the bracket 1 respectively. The lever shaft 3, after having been rotated at 180°, is moved to a certain extent toward the screw thread 33 side, the engaging portion 31 engages with the retaining bore 18, and the lever shaft 3, and in turn the bushing 8, are restrained from rotation with respect to the bracket 1. As a result, there is no risk of the lever shaft 3 carelessly rotating, thereby enabling the grip dimension to be kept reliably in the changed condition.

Also, since the pivot point $O_1$ at the operating lever 4 shifts and the retainer 6 for the operating wire is disposed at the same side as center $O_2$ relative to the circular arcs forming the abutting surfaces 16 and 44, it is possible to reduce an amount of shift of retainer 6 in the pull direction of the operating wire when the grip dimension is changed, thereby eliminating the inconvenience of adjusting an effective length of the wire at the brake side.

In the aforesaid embodiment, the center $O_2$ of the circular arc at the respective abutting surfaces 16 and 44 is not particularly defined of its location. For example, when the center $O_2$ is provided at the position where the retainer 6 is supported, the retainer 6 can be prevented from shifting with respect to the bracket 1 when the grip dimension is changed, thereby keeping constant the effective length of operating wire W relative to the outer sheath.

Figure 7:
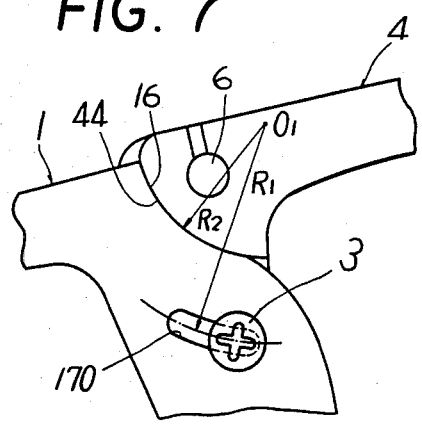
FIGS. 7 and 8 are partially side views of modified embodiments of the invention respectively.
Figure 8:
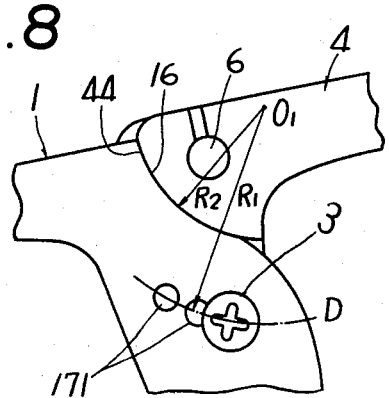

Alternatively, the aforesaid adjusting means may be so constructed that the bracket 1, as shown in FIG. 7, is provided with an elongate slot 170 extending along the circumference of the concentric circle D which is concentric with arc at the respective abutting surfaces 16 and 44 and the lever shaft 3 may be fixed at a predetermined position at the elongate slot 170 through a fixing means, such as a screw means. Also alternatively, the bracket 1, as shown in FIG. 8, may be provided with a plurality of bearing bores 171 along the circumference of circles and the lever shaft 3 may be supported selectively to one bearing bore 171. In these embodiments, the adjusting means is not defined or limited by the construction of each embodiment.

In the embodiment providing the slot 170, the pivot point is adjustable not-stepwise but continuously and the embodiment providing the plurality of bearing bores 171, the pivot point $O_1$ is changable at three or more steps.

Although several embodiments have been described, they are merely exemplary of the invention and not to be constructed as limiting, the invention being defined solely by the appended claims.

What is claimed is:

1. A brake operating device mounted to a handle of a bicycle, comprising:
   a bracket having a first abutting surface,
   an operating lever having an operating portion and a pivot portion, said pivot portion being pivoted swingably to said bracket, said operating lever having a second abutting surface abutting against said first abutting surface to restrict a grip dimension between said operating portion and said handle,
   a pivoting means including a lever shaft for pivoting said operating lever relative to said bracket at a pivotal center,
   said first and second abutting surfaces each being formed in a shape of a circular arc centered at a position spaced with respect to said pivotal center of said pivoting means, and
   an adjusting means enabling said pivotal center to shift on a circumference of a circle concentric with said circular arcs forming said first and second abutting surfaces, said adjusting means securing said pivoting means at a position on said circumference of said circle to which said pivotal center is shifted, thereby adjusting said grip dimension between said lever and said handle.

2. A brake operating device as set forth in claim 1, wherein said pivoting means further comprises a bushing having an eccentric fitting portion into which said lever shaft is fitted non-rotatably relative to said bushing, said operating lever being supported rotatably to said bushing, and said adjusting means being disposed between said bracket and said lever shaft, said adjusting means for positionally shifting said bushing relative to said bracket to shift said pivotal center on the circumference of said circle which is concentric with said circular arcs forming said first and second abutting surfaces.

3. A brake operating device as set forth in claim 2, wherein said bracket has a non-round retaining bore for supporting said lever shaft, said lever shaft having a non-round engaging portion engageable with said retaining bore, so that a change in an engaging position of said engaging portion with said retaining bore is adapted to cause said pivotal center to shift on the circumference of the circle which is concentric with said circular arcs forming said abutting surfaces respectively.

4. A brake operating device as set forth in claim 1, wherein said bracket has an elongate slot formed in a circular arc concentric with said circular arcs at said abutting surfaces respectively and has a fixing means for fixing said lever shaft in a predetermined position at said elongate slot.

5. A brake operating device as set forth in claim 1, wherein said bracket has a plurality of bearing bores for supporting said lever shaft, said bearing bores being located along a circular arc which is concentric with said circular arcs forming said abutting surfaces.

6. A brake operating device as set forth in claim 1, wherein said operating lever has a support bore for retaining one end of an operating wire, said support bore nearly coinciding at its center with centers of said circular arcs forming said abutting surfaces.

* * * * *